C. B. TRUMBLE.
ANIMAL TRAP.
APPLICATION FILED APR. 29, 1907.
905,390.
Patented Dec. 1, 1908.
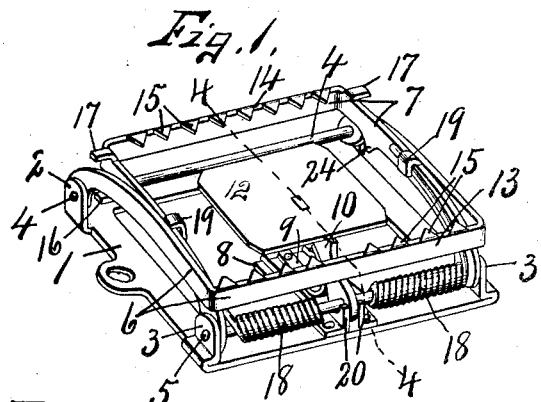
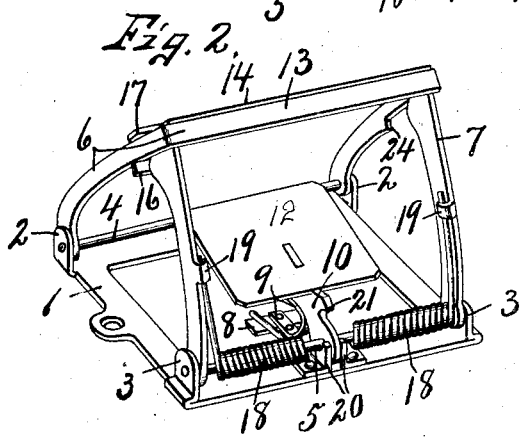
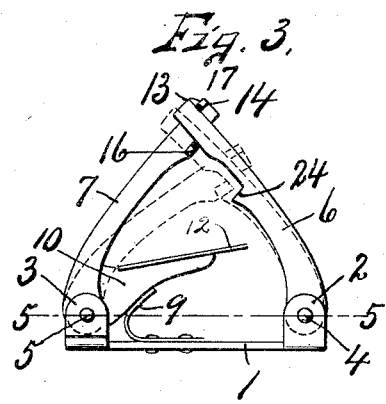
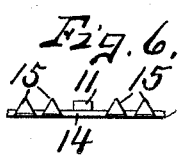
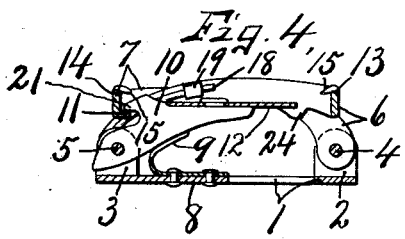
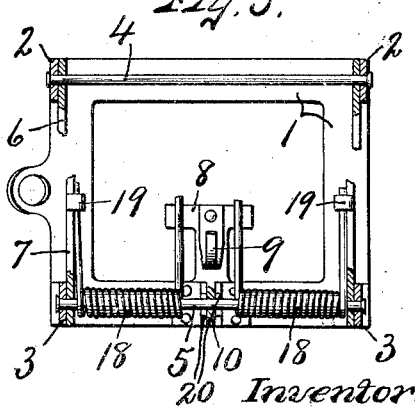
Witnesses.
Inventor.
C. B. Trumble
By
Howard P. Arnson
Attorney.

UNITED STATES PATENT OFFICE.

CHAUNCEY B. TRUMBLE, OF SYRACUSE, NEW YORK, ASSIGNOR TO ONEIDA COMMUNITY, LIMITED, OF ONEIDA, NEW YORK, A CORPORATION OF NEW YORK.

ANIMAL-TRAP.

No. 905,390.          Specification of Letters Patent.          Patented Dec. 1, 1908.

Application filed April 29, 1907. Serial No. 370,904.

*To all whom it may concern:*

Be it known that I, CHAUNCEY B. TRUMBLE, of Syracuse, in the county of Onondaga, in the State of New York, have invented new and useful Improvements in Animal-Traps, of which the following, taken in connection with the accompanying drawings, is a full, clear, and exact description.

This invention relates to certain improvements in animal traps of the spring-actuated-jaw-type in which two opposed jaw-supporting frames are pivoted upon a suitable base, one of which jaws is spring-actuated and has sliding interlocking connection with the other jaw to actuate the latter when the spring-actuated jaw is released, so that both jaws close simultaneously, the spring-actuated jaw being held in its open position by a suitable platform-actuated detent.

My object is to produce a simple, practical and efficient animal trap which may be manufactured at a comparatively small cost from sheet or cast metal and in which the jaw-frames have sliding interlocking connection with each other, whereby the movement of one jaw to either its open or closed position positively transmits a similar movement to the other jaw.

Another object is to provide the jaw frames with co-acting members adapted to interlock to prevent the jaws from being pried open by the animal while caught in the trap.

In the drawings—Figures 1 and 2 are perspective views respectively showing the trap in its open and closed positions. Fig. 3 is an end view of the closed trap. Figs. 4 and 5 are sectional views taken respectively on lines 4—4, Fig. 1, and 5—5, Fig. 3. Fig. 6 is a top plan of a portion of one of the jaws.

In carrying out the objects stated I provide a suitable base —1—, which in this instance, is rectangular in form, and provided at its corners with opposite pairs of upturned ears —2— and —3— in which are mounted spindles 4— and —5— for supporting opposite jaw-frames —6— and —7—.

The base —1— and jaw-frames —6— and —7— are preferably made of sheet metal, the base —1— consisting of an open rectangular sheet metal frame having an integral arm —8— projecting inwardly from one side and supporting a spring —9— acting upon a lever or detent —10— to force the latter automatically into interlocking engagement with a shoulder —11— on the jaw —6— to hold the jaws in their open position, as best seen in Fig. 4, said lever or trigger —10— being provided with a suitable bait-receiving element, as a platform —12—. The jaw-frames —6— and —7— are preferably U-shape, being in this instance, made from two bars of sheet metal, the opposite ends of the bars —6— being pivoted to the ears —2— by the pintle or rod —4—, while the opposite ends of the bar —7— are pivoted to the ears —3— at the opposite side of the frame —1— by the pintle or spindle —5—. The intermediate portions of both of these jaw-frames —6— and —7— are disposed some distance from and parallel with their respective swinging axes, and constitute gripping jaws, as —13— and 14— having biting teeth 15—, which interlock or mesh with each other when the jaws are closed, so as to bring the meeting edges of said jaws into close contact. These jaw-frames —6— and —7— move one within the other; that is, when open, they converge upwardly from their respective axes, the jaw-frame —7— passing through the jaw-frame —6— within the jaw —13— and between the opposite arms which unite said jaw to the base —1—.

The jaw-frame —7— is provided at each end with inner and outer lugs or shoulders —16— and 17— projecting endwise therefrom and having sliding engagement with the inner and outer edges of the sides of the jaw frame —6—, thereby establishing a sliding interlocking connection between the two jaw-frames, so that when one jaw is open, or closed, similar motion is imparted by it to the other jaw. In this particular device shown in the drawings the jaw-frame —7— is actuated to close the jaws by a pair of coil springs —18— each encircling the spindle —5— between the trigger or lever —10— and one of the ears —3—, one end of each spring being engaged with a suitable shoulder —19— on one side of the frame, and the other end of said spring being engaged with a laterally projecting arm —8— of the frame —1—.

In opening the jaw-frame —7— against the action of the spring 18— the other jaw —6— falls by gravity, or is forced to its open position by the lugs or shoulders 17— riding upon the outer faces of the sides of said frame —6—, the distance between the axis of the jaw-frame —7— and the space between each pair of lugs being substantially equal to the distance between the axes of the opposite jaw-frame so as to allow said frame to lie as flat as possible, or close to the base when in their open position. The platform-trigger —10— is pivoted upon the central portion of the spindle —5— between suitable ears —20— of the adjacent side of the base —1—, which ears form a support for the central portion of the spindle, and also hold the trigger against undue lateral movement.

In setting the trap the spring-actuated jaw —7— is pressed downwardly against the action of the spring —18— until the shoulder —11— on the central portion of the said jaw encounters, and depresses the trigger —10— against the action of the spring —9— sufficient to allow the shoulder —11— to ride under a similar shoulder —21— on the trigger —10—, whereupon said trigger is operated by the spring —9— to force the shoulder —21— into holding engagement with the shoulder —11— of the jaw —6—, it being understood that the jaw-frame —6— drops automatically to its open position, or is forced into such position by the shoulders —17—, as the jaw —7— is opened, and when the jaw —6— is locked in the manner just described, by the trigger —10—, it, in turn, locks the jaw frame —7— in its open position by reason of the engagement of the shoulder —16— with the under sides of the opposite arms of the now locked jaw-frame —6—, said shoulders —16— engaging the under sides of the opposite arms of the jaw-frame —6— near the swinging axis of the latter, where but little power is required to hold the jaw-frame —7— open against the action of the spring —18—. When the platform trigger —10— is depressed or tripped by the animal to release the jaw —6— the jaw-frame —7— is immediately thrown to its closed position by the spring —18—, and the paw —6— is similarly thrown to its closed position by the sliding action of the shoulder —16— upon the under side of its opposite arms. The distance between the shoulders —16— and 17 of each pair is slightly greater than the portions of the side arms of the jaw-frame —6— which they embrace so as to permit free sliding movement of the sides of the frame —6— between said shoulders.

In order to prevent the jaws from being pried open by the animal when caught therein, I provide one of the side arms of the jaw-frame —6— with a shoulder —24— on the under side thereof and a short distance from the jaw 13— and in the path of movement of one of the lugs or shoulders —16— so that any attempt to open or pry the jaws apart when once closed upon the animal, is positively resisted by engagement of the shoulder —16— with the shoulder —24—, although in setting the trap, sufficient clearance is left between the shoulders —16— and 17—to permit the jaw-frame —7— to be elevated enough to clear the shoulder —24—.

What I claim is:

1. An animal trap including two pivoted jaw-frames, a spring for actuating one of the frames in one direction and sliding interlocking connections between said frames whereby motion is transmitted from one frame to the other, and shoulders carried by the jaws to prevent the jaws from being pried open by the animal when caught thereby.

2. In an animal trap in combination, a supporting base, jaw-frames pivoted to the base and having sliding interlocking connection one with the other, and means to prevent the jaws from being pried open by the animal when caught thereby.

3. An animal trap comprising two pivoted jaws, one jaw being spring-actuated and having sliding interlocking connection with the other jaw, and a spring-actuated platform detent for one jaw, and shoulders carried by the jaws to prevent the jaws from being pried open by the animal when caught thereby.

In witness whereof I have hereunto set my hand this 24th day of April 1907.

CHAUNCEY B. TRUMBLE.

Witnesses:
H. E. CHASE,
MILDRED M. NOTT.